Sept. 30, 1958     C. C. WETZEL     2,854,083
CARROT HARVESTERS
Filed Nov. 14, 1955

INVENTOR.
CLIFFORD C. WETZEL
BY Fearman & Fearman
ATTORNEYS ated Sept. 30, 1958

2,854,083
CARROT HARVESTERS

Clifford C. Wetzel, Ithaca, Mich.

Application November 14, 1955, Serial No. 546,322

7 Claims. (Cl. 171—61)

This invention relates to carrot harvesters of novel and improved construction.

One of the prime objects of the invention is to design a vegetable harvester which is particularly well suited to the harvesting of "finger" carrots. While vegetable harvesters of various description are well known, most have been designed to process sugar beets or other vegetables which need not be handled with particular care. These machines are unsuited to harvesting "finger" carrots which cannot be bruised or skinned during the process of unearthing and defoliating them and which further must have the foliage uniformly severed so that no foliage stubs remain. Those familiar with the growing and marketing of carrots will realize that by "finger" carrots are meant the relatively long, slender carrots which are harvested and packaged for shipment under refrigeration to various parts of the country. These high grade vegetables are to be distinguished from the relatively thick crowned so-called "soup" carrots which are for local consumption or immediate canning and need not be harvested with particular care.

In accordance with the above a specific object of the invention is to design a harvester which carries the carrots from the ground to the severing disks or knives in at least two stages, mechanism being employed in the first stage which is suited to removing the carrots from the ground, and mechanism being employed thereafter which adjusts the spacing and position of the carrots so that they approach the defoliating discs in proper position whereby the foliage may be cut off at the crown without cutting off part of the crown or leaving foliage stubs.

A further object of the invention is to design a harvester of the character described in which the severing disks are shaped and positioned to very efficiently cut off all of the foliage without cutting into the crown of the carrot.

A still further object of the invention is to design a harvester which cleans the carrots in a novel manner as they leave the severing discs.

Another object of the invention is to provide a harvester of durable construction which is highly reliable in operation and can be very economically manufactured and assembled on a tractor or other vehicle.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Referring now more particularly to the accompanying drawings wherein I have shown a prefered embodiment of the invention a letter F generally indicates a frame for supporting the various elements from a tractor or the like. This frame F will be shown only fragmentarily since it forms no part of the instant invention and in fact would vary considerably depending on the particular tractor or the like from which it was desired to support the harvester. Suffice it to say that the frame F may be supported by the frame of the vehicle in any suitable manner.

Figure 5:
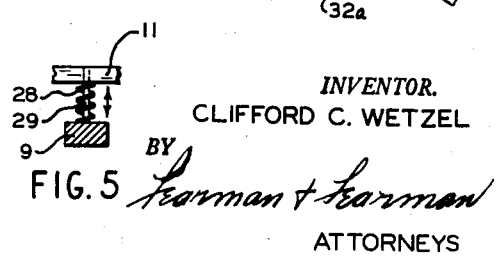
Fig. 5 is a fragmentary enlarged view partly in top plan and partly in section of a detail of the apparatus and showing the manner in which one of the frame members is supported so that it can move laterally outwardly.

Depending frame members 9 and 10 support pairs of inclined longitudinal frame members 11 and 12 respectively which are generaly co-linear. The front ends of members 11 lap the rear ends of members 12 as shown and one member 11 may be connected by a block member 13 to a member 12. The other member 11 is supported at its front end in a manner which will be later described by a member 9 as shown in Fig. 5. The rear end of this one member 11 may be pivoted as at 30 to a rear member 9. Thus this one member 11 may be moved outwardly a limited distance against the force exerted by the spring 29 to tend to aid in the separation of the carrots and will prevent damage to the mechanism if some hard, unyielding, foreign object should be inadvertently picked up.

Carried under the longitudinal members 11 and 12 by members 31 connected to frame F is a lifter arm 32 having a plow head 32a thereon which runs beneath the ground as the machine proceeds along a row. The lifter tends to elevate the carrots by breaking the ground beneath them so that the initial transporting belts 24 are greatly assisted in pulling the carrots from the earth. Guide fingers 33 extending from the frame members 12 forwardly of the belts 24 channel the carrot foliage in between the belts 24.

Figure 3:
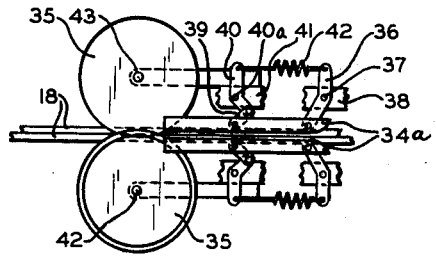
Fig. 3 is an enlarged inverse plan view taken on the line 3—3 of Fig. 1 showing the severing discs and the positioning guides associated therewith.
Figure 1:
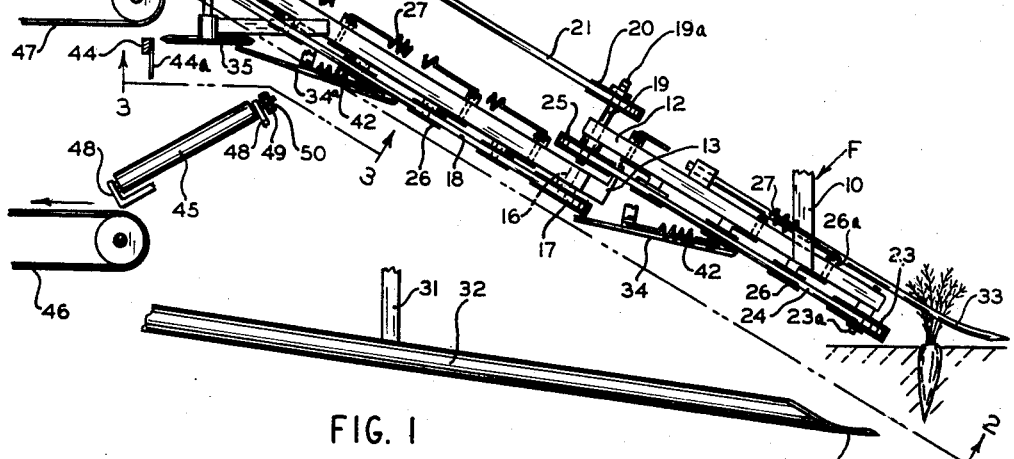
Fig. 1 is a fragmentary side elevational view of various harvester elements constructed and arranged in accordance with the invention.
Figure 4:
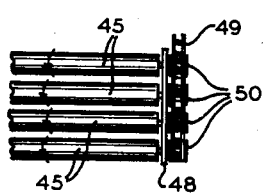
Fig. 4 is a top plan view of the cleaning rolls only.

Mounted under the rear ends of the frame members 12 are a pair of downwardly pitched guide bars 34 which are spaced apart a distance sufficient to receive the carrot foliage but insufficient to receive the crowns of the minimum sized carrots it is desired to harvest. Identical guide bars 34a are mounted under the rear ends of frame members 11 and terminate at their rear ends directly adjacent and on a level with a pair of rotary cutting disks or knives 35. Each guide bar 34a (see Fig. 3) is mounted at its front end on a bell crank lever 36 which is pivotally supported intermediate its ends at 37 on a member 38 of the frame F. Each bar 34 is connected at its rear end to a link 39 which is pivotally mounted on an end of a bell crank lever 40, the latter lever 40 being pivotally mounted as at 40a on a member 41 of the frame F. Springs 42 connect the free ends of the levers 36 and 40 and tend to maintain the sets of bars 34 in the position in which they are shown in Fig. 3. If the front ends of either set of guide bars 34 are spread by the stems of a larger size carrot the rear ends thereof which might be guiding the smaller stems of a smaller carrot will remain in position. Similarly if the rear ends of the bars 34 are spread the front ends thereof will be unaffected.

Shafts 42 and 43 driven from drive mechanism on the tractor, as are the shafts 14 and 14a, revolve the cutting disks 35 in blocks 13.

Figure 2:
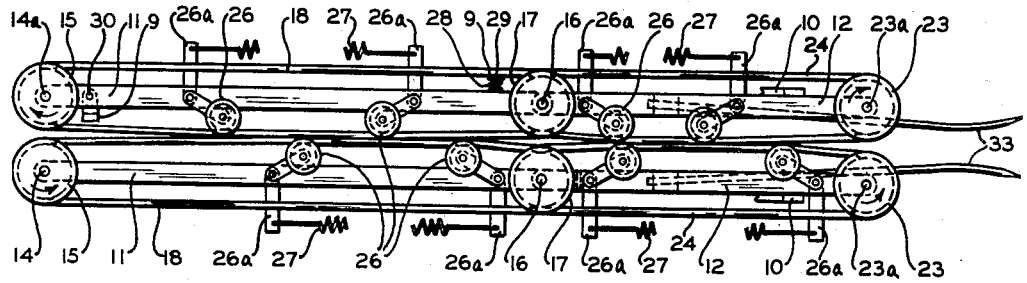
Fig. 2 is an inverse plan view taken on the line 2—2 of Fig. 1, the lowering guides being omitted from the view in the interests of clarity.

Drive shafts 14 and 14a are journaled in bearings provided in the rear ends of the frame members 11 and extend therebelow, and pulleys or sheaves 15 are keyed on the lower ends thereof. Stub shafts 16 similarly depend from and are journaled in bearings provided in the front ends of members 11 and have pulleys 17 keyed thereon so that longitudinally extending transporting belts 18 may be trained around the pulleys 15 and 17. As will be observed from an inspection of Fig. 2 the drive shafts 14 and 14a are driven in opposite directions by drive mechanism on the tractor.

Extending upwardly from members 12 are shafts 19 and 19a which are journaled in bearings provided in the rear ends of the members 12. Pulleys or sheaves 20 keyed on the shafts 19 and 19a are driven by means of belts 21 from reduced pulleys 22 on the shafts 14 and 14a as shown. Pulleys 23 are mounted on stub shafts 23a on the front ends of frame members 12 and pulling and transporting belts 24 are trained around the pulleys 23 and drive pulleys 25 which are mounted on the shafts 19 and 19a at the rear of frame members 12.

Preferably the pulleys 20 will be twice the diameter of pulleys 22 so that the belts 18 are driven at twice the speed of the belts 24. The speed of belts 18 will be referred to as "fast" relative to the speed of belts 24 which will be referred to as "slow" in comparison.

It will be observed that the pulleys 15 and 17, and 25 and 23 are relatively closely spaced apart so that very little clearance is left between the transport belts 18 and 24 which must grip or clamp the foliage of the carrots between them and convey the carrots rearwardly. To maintain the pair of belts 18 and pair of belts 24 in substantial engagement idler rollers 26 are mounted on corresponding ends of pairs of oppositely disposed bell crank levers 26a. The other ends of the levers of each pair are connected by springs under tension 27 so that the idlers tend to move the carrying or transporting belts toward one another.

At the point where the transfer of carrots is effected from belts 24 to belts 18 the one frame member 11 should be mounted so that it can spread slightly and accordingly a spring 28 on bolt 29 may be interposed between the opposed reaches of the belt 18 as indicated. The disks it will be noted are flat and lap slightly so that tough, dead and frozen foliage will be sheared from the carrots when carrots with such foliage are encountered, and it is further important to note that the blades are arranged in horizontal disposition so that the foliage is cut off absolutely normal to the length of the carrots. Otherwise roots will be left or part of the crowns of the vertically hanging carrots will be sheared off.

Provided rearwardly of the disks 35 on a member 44 connected to frame F is a baffle wall 44a which deflects the carrots downwardly to a set of rotating, inclined, cleaning rolls 45 which tumble the earth off the carrots without bruising or skinning them, as they proceed to a discharge conveyor 46. The foliage is carried to the conveyor 47 for discharge by the belts 18. A frame 48 supported by frame F supports the rolls 45 which are all driven in the same direction by a chain 49 which is trained around sprockets 50 on the ends of the rolls. The chain 49 is driven from drive mechanism on the tractor in any suitable manner.

In operation the apparatus is moved along a row of carrots with the guide fingers 33 and the pulleys 23 just off the ground. It is to be emphasized that carrots are not thinned, as are sugar beets for example, and often are found growing in pairs or small clusters. If the carrots are brought to the cutting disks in bunches only the centralmost carrot will hang vertically and the others in the bunch will obviously hang at an angle. If a carrot is presented to the cutting disks at an angle, obviously, it will have a part of its crown sheared off. While it is immaterial whether sugar beets and the like have their crowns sheared off, it is highly important that even the skin of the crowns of premium "finger" carrots remain intact. Accordingly, it is necessary that the carrots which often are pulled from the ground in doubles or small groupings be separated prior to the time they reach the severing discs 35.

The instant machine employs two stages of transport to separate the carrots so that each hangs individually when it is brought to the disks and is not displaced angularly by another. The travel of belts 24 is slightly faster in linear feet per second than the travel of the apparatus along a row so that the belts can best function to pull the crop from the earth. The sheaves 23 are close enough to the ground line so that the belts 24 grip the foliage close to the crowns where the foliage stems are stronger and there is more foliage. When, however, the foliage is tightly gripped in this manner relatively little separation of bunched carrots or doubles can occur. The front guides 34 not only assist in transferring the carrots from one stage to another (from belts 24 to belts 18), but also provide an opportunity for the carrots to separate.

When the carrots are supported from their extreme tops as occurs when the guides 34 lower them, one carrot can roll on another and will tend to pass or fall behind another. When the carrots pass to belts 18 which are traveling twice as fast as belts 24, the leading carrots are engaged first and separated rapidly from those behind. The purpose of belts 18 then is to thin out the carrots approaching the severing discs and separate them one from another. Finally the rear guides 34 provide a further opportunity for separation and deliver the carrots to the disks at exactly the right level for the disks to fully sever the foliage stems without shearing off any part of the crowns.

The action of the rolls 45, which are spaced apart so that carrots or the like below a minimum size can fall therethrough, is to tumble and lightly rub the carrots to dislodge earth clods or particles therefrom.

It should be understood that while the machine which I have designed is particularly well suited to the harvesting of "finger" carrots which cannot be harvested with conventional harvesting equipment, I do not intend that the machine should be limited to this particular application.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. Vegetable harvesting apparatus comprising a frame, means supported by said frame for removing vegetables from the earth; first relatively slow moving conveying means supported by said frame in a position to receive vegetables and transport them from the removing means; second relatively fast moving conveyor means supported by the frame in a position to receive vegetables and transport them from said first conveying means; cutting means supported by said frame in a position to sever the vegetables from their foliage; and means connected to said first and second conveying means for driving said first and second conveying means at their respective relative speeds, whereby vegetables transported by said second conveying means will be spaced farther apart than vegetables transported by said first conveying means.

2. Apparatus as set forth in claim 1 including guide means supported by said frame for guiding said vegetables to said cutting means in such position that only the foliage and none of the crown of the vegetable is cut.

3. Apparatus as set forth in claim 2 in which said guide means comprises an assembly of a pair of normally parallel rods pivotally linked adjacent to each end to said frame so that the rods of said assembly are capable of being spread apart at each end of the latter at different times without having the other end spread apart.

4. Apparatus as set forth in claim 3 including yieldable means interconnecting the links of said bars for yieldably biasing them towards their parallel positions.

5. Apparatus as set forth in claim 1 including third conveying means supported by said frame in a position to receive severed foliage and vegetables from said cutting means and transporting same away from said cutting means independently.

6. Apparatus as set forth in claim 5 in which said third conveying means includes a pair of endless belts one of which is positioned to receive severed foliage and the other of which is positioned to receive vegetables severed from their foliage.

7. Apparatus as set forth in claim 6 including means on said frame interposed between said cutting means and the severed vegetable conveying means for cleaning the latter.

References Cited in the file of this patent

UNITED STATES PATENTS

| | | |
|---|---|---|
| 1,198,985 | Ackerman | Sept. 19, 1916 |
| 1,294,801 | Hayes et al. | Feb. 18, 1919 |
| 1,295,591 | Pocock | Feb. 25, 1919 |
| 1,333,886 | Van Houten | Mar. 16, 1920 |
| 1,403,929 | Welton | Jan. 17, 1922 |
| 1,589,502 | Woodson | June 22, 1926 |
| 1,905,194 | Urschel | Apr. 25, 1933 |
| 1,976,855 | McKee et al. | Oct. 16, 1934 |
| 2,197,225 | Pierson | Apr. 16, 1940 |